United States Patent [19]
Morimoto

[11] Patent Number: 5,194,982
[45] Date of Patent: * Mar. 16, 1993

[54] SCANNING OPTICAL SYSTEM

[75] Inventor: Akira Morimoto, Tokyo, Japan

[73] Assignee: Asahi Kogaku Kogyo Kabushiki Kaisha, Tokyo, Japan

[*] Notice: The portion of the term of this patent subsequent to Jul. 28, 2009 has been disclaimed.

[21] Appl. No.: 853,043

[22] Filed: Mar. 18, 1992

Related U.S. Application Data

[63] Continuation of Ser. No. 494,326, Mar. 16, 1990.

[30] Foreign Application Priority Data

Mar. 17, 1989 [JP] Japan ................................ 1-63934
Sep. 14, 1989 [JP] Japan ................................ 1-239153

[51] Int. Cl.⁵ .............................................. G02B 26/10
[52] U.S. Cl. ..................................... 359/216; 359/206; 359/212; 250/201.4; 250/235
[58] Field of Search ............... 359/202, 206, 207, 212, 359/216, 217, 218, 219; 250/201.4, 235, 236; 346/108

[56] References Cited

U.S. PATENT DOCUMENTS

| | | | |
|---|---|---|---|
| 3,153,723 | 10/1964 | Weiss . | |
| 4,070,089 | 1/1978 | Grafton | 359/202 |
| 4,070,111 | 1/1978 | Harrick | 356/308 |
| 4,084,881 | 4/1978 | Hirabayashi et al. | 359/207 |
| 4,196,961 | 4/1980 | Walter et al. | 359/219 |
| 4,274,703 | 6/1981 | Fisli | 359/218 |
| 4,538,181 | 8/1985 | Taylor | 358/208 |
| 4,583,128 | 4/1986 | Anderson et al. | 358/302 |
| 4,629,885 | 12/1986 | Asemyr | 250/235 |
| 4,733,064 | 3/1988 | Ishikawa | 359/218 |
| 4,756,583 | 7/1988 | Morimoto | 359/212 |
| 4,756,584 | 7/1988 | Takanashi | 359/218 |
| 4,823,002 | 4/1989 | Saito | 250/235 |
| 4,863,250 | 9/1989 | Ishizuka | 359/662 |
| 4,868,377 | 9/1989 | Nishikawa | 250/201.5 |
| 5,055,663 | 10/1991 | Morimoto et al. | 250/201.4 |
| 5,084,616 | 1/1992 | Morimoto | 250/235 |

FOREIGN PATENT DOCUMENTS

| | | | |
|---|---|---|---|
| 59-15216 | 1/1984 | Japan | 359/217 |
| 60-233616 | 11/1985 | Japan . | |
| 63-146015 | 6/1988 | Japan . | |

*Primary Examiner*—Loha Ben
*Attorney, Agent, or Firm*—Sandler, Greenblum & Bernstein

[57] ABSTRACT

A scanning optical system projects a light beam from a light source as a line spread function image in a principal scanning plane before the light beam is made incident onto a scanning deflector. A static deflector is disposed in a line spread function image position to guide a light beam from a light source to the scanning deflector. The static deflector has a slit mirror for reflecting a light beam from the light source or a mirror with a slit for permitting a light beam to be transmitted therethrough.

15 Claims, 16 Drawing Sheets

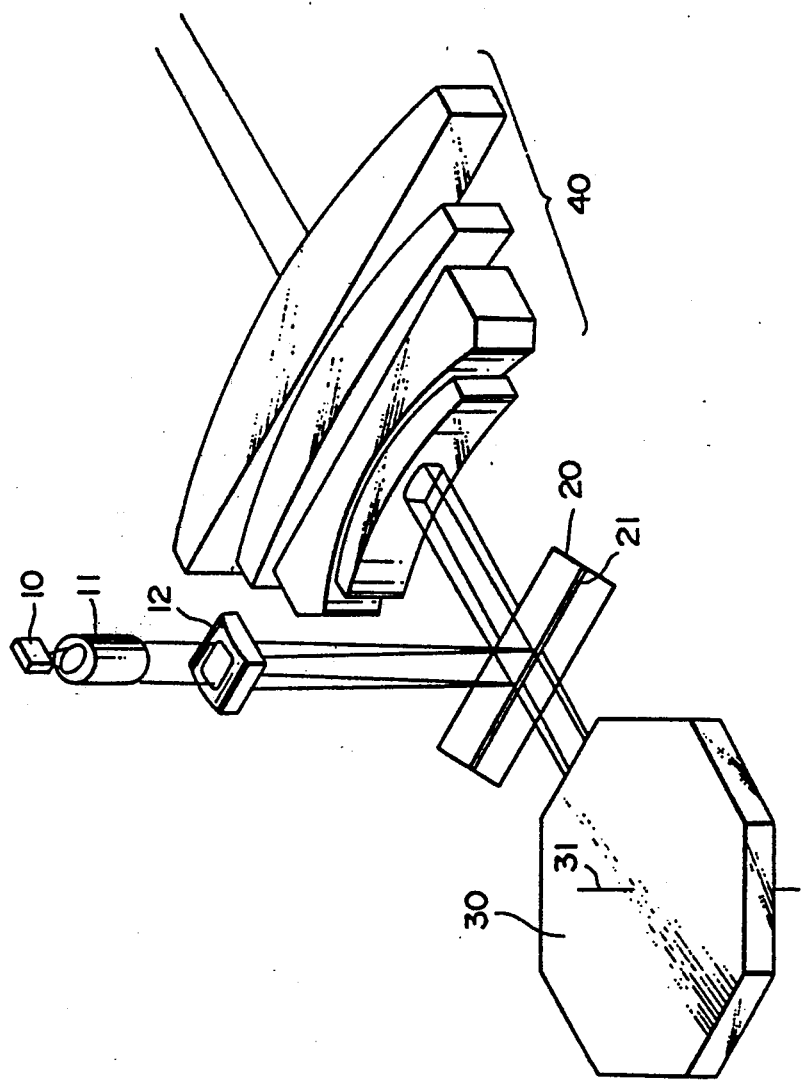

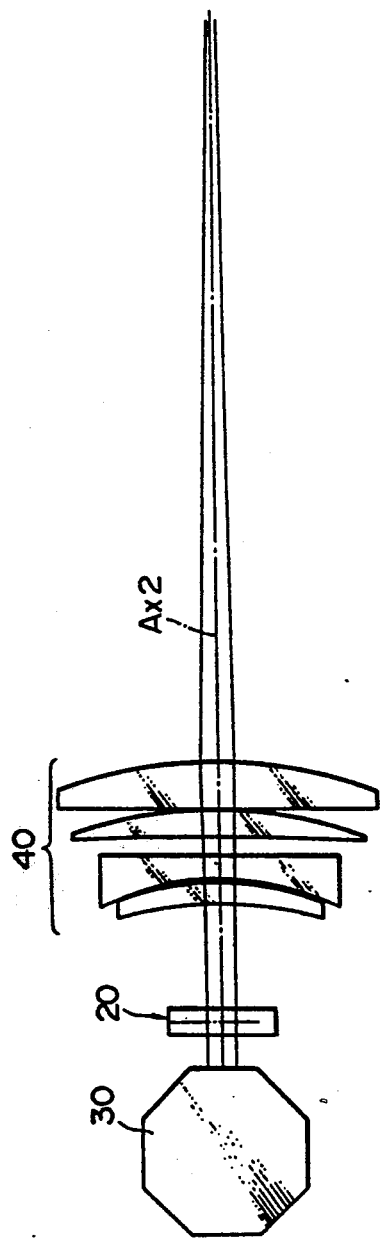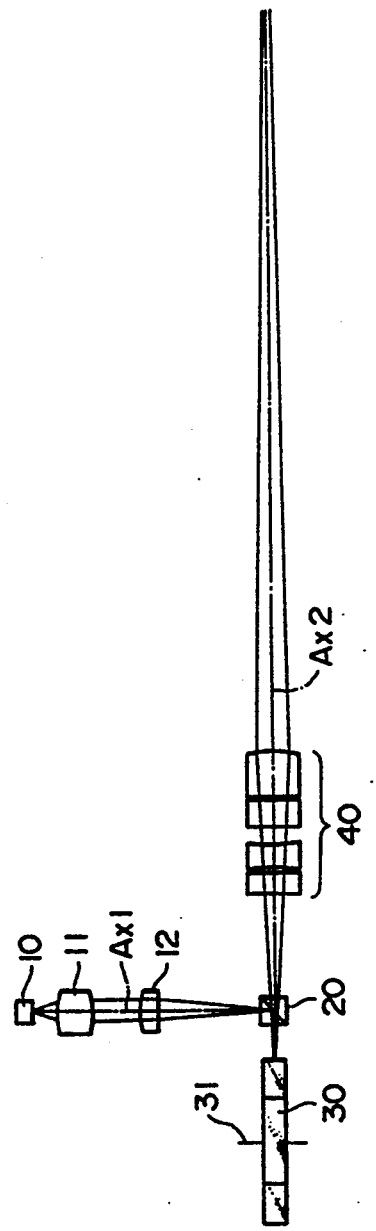

FIG. 6
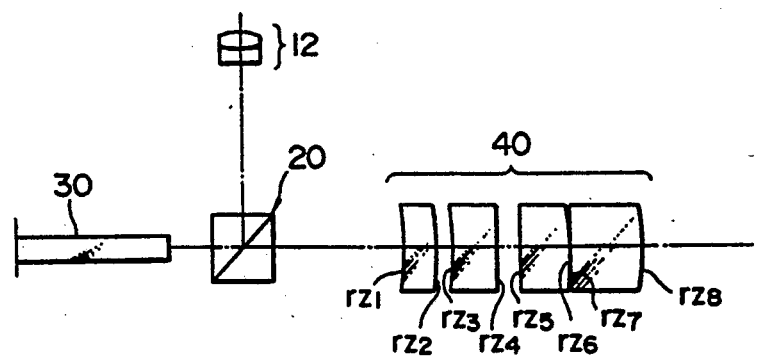
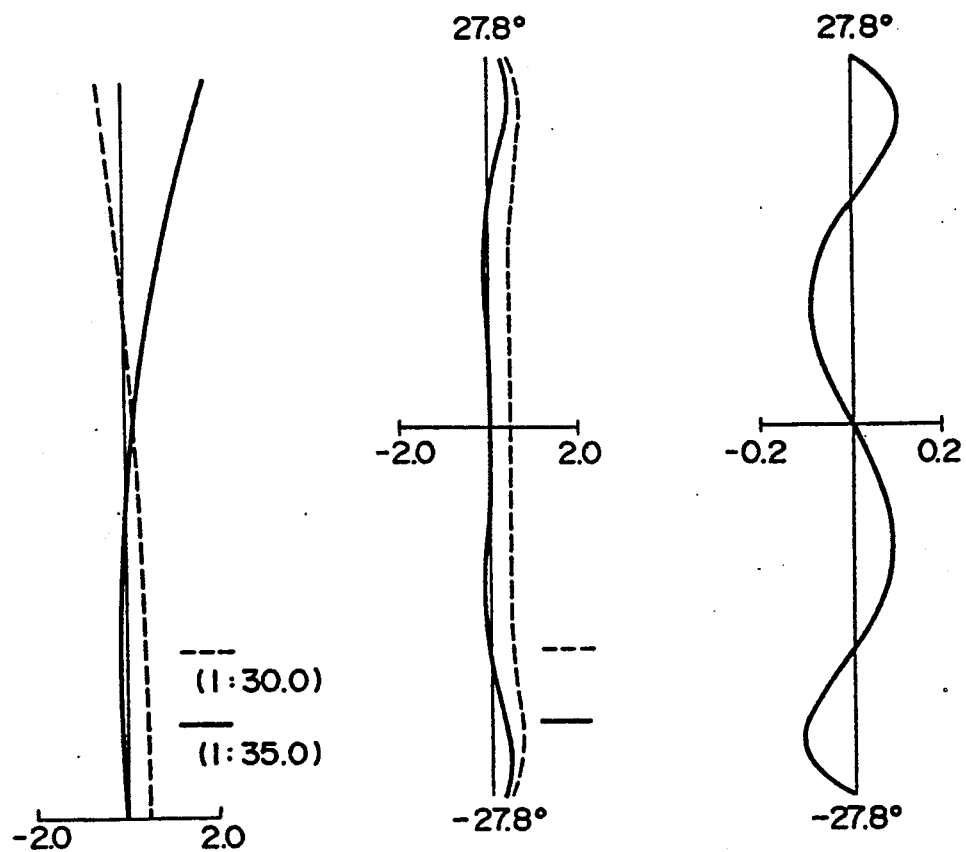
FIG. 7A FIG. 7B FIG. 7C

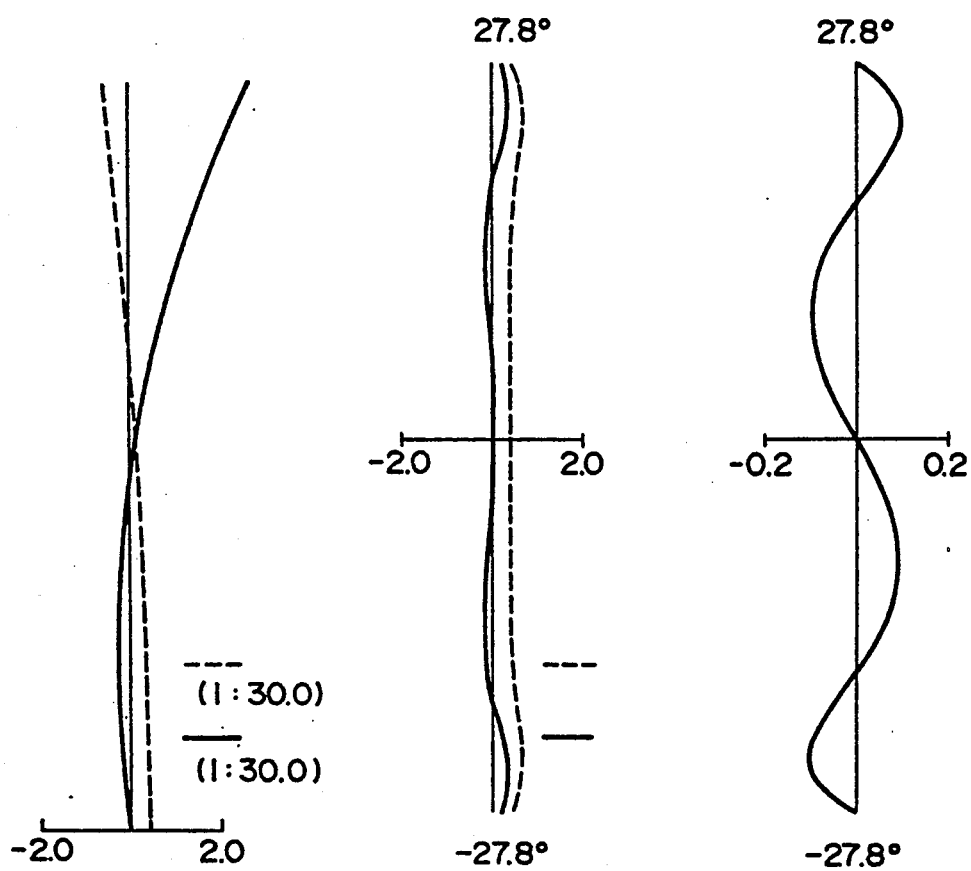

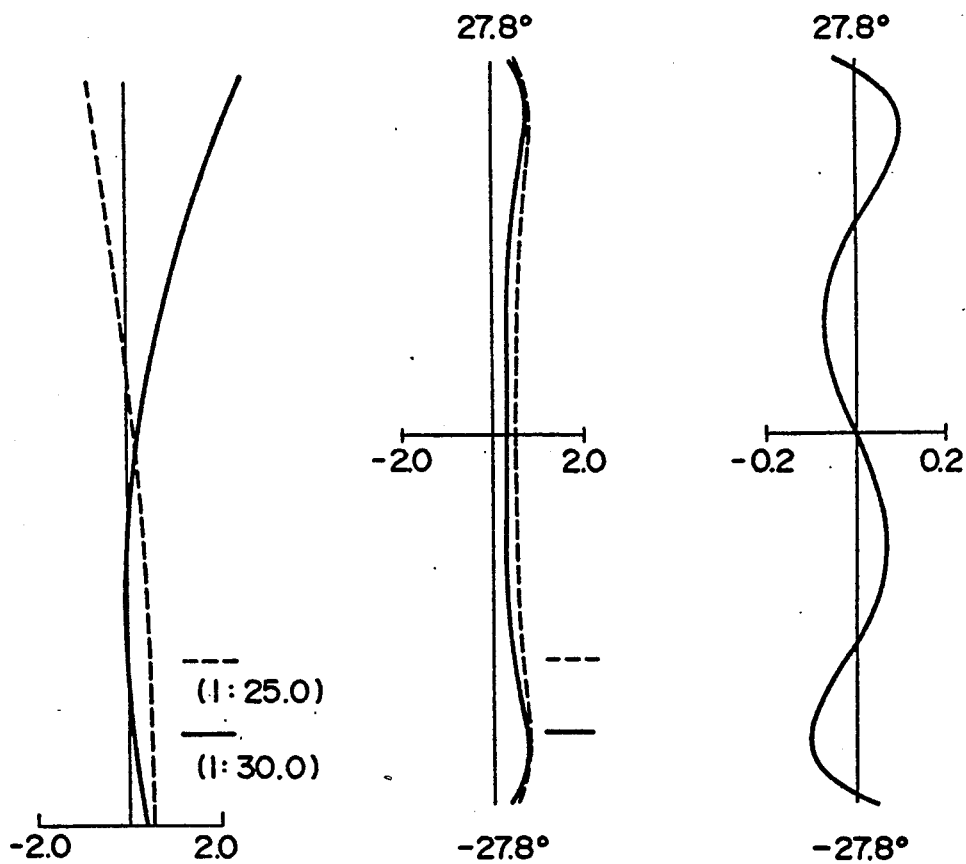

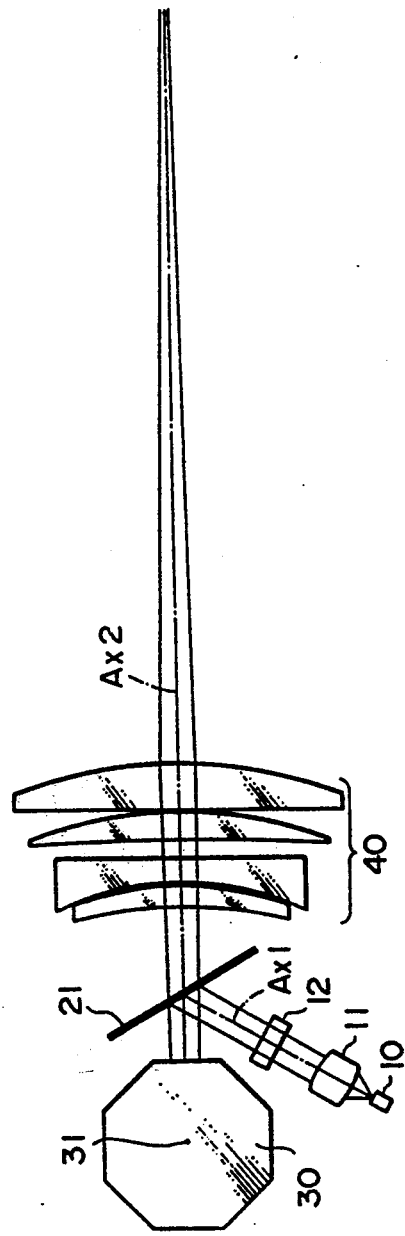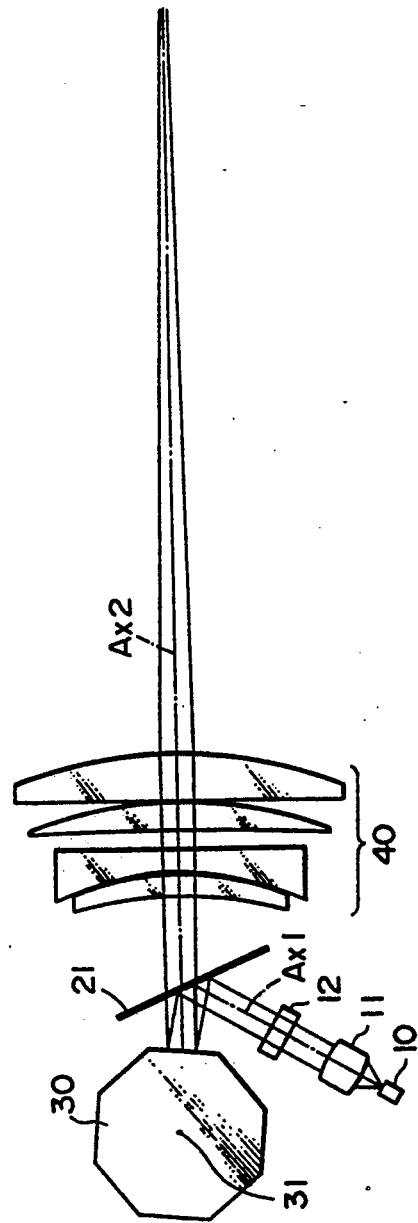

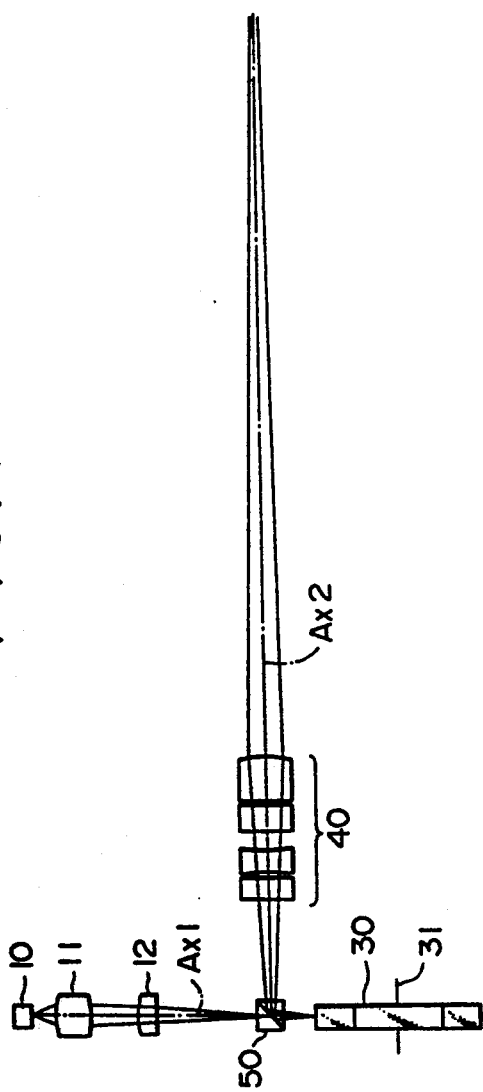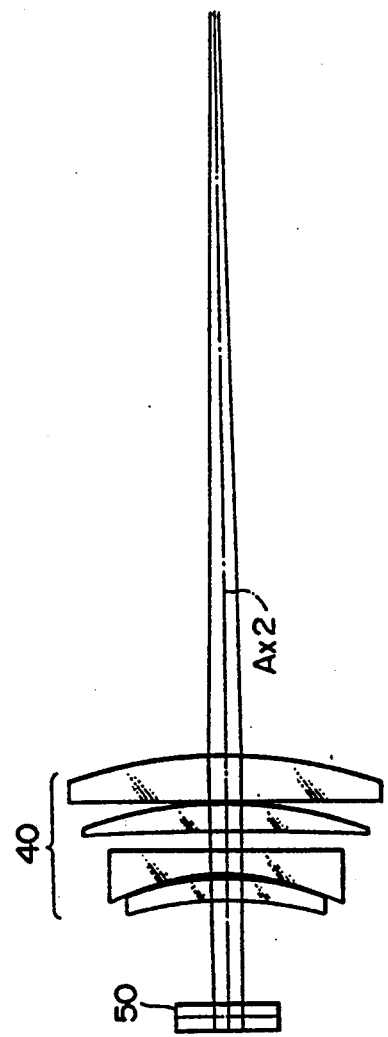

SCANNING OPTICAL SYSTEM

This application is a continuation of application Ser. No. 07/494,326, filed Mar. 16, 1990, (status pending, etc.).

BACKGROUND OF THE INVENTION

1. Field of the Invention

This invention relates to a scanning optical system for scanning a laser beam on a scanning surface to form a pattern thereon, and particularly to an apparatus in which a pattern to be formed is high in accuracy.

2. Description of the Prior Art

In a conventional scanning optical system, as shown in FIG. 20, an intensity modulated laser beam is made incident to a polygon mirror 1 and the light beam reflected and deflected by the polygon mirror 1 is focused by an fθ lens 2 thereby to form a spot on a surface to be scanned. In general, the angle formed by an optical axis Ax1 of the light beam made incident to the polygon mirror 1 and an axis Ax2 of an fθ lens is approximately 50°–90°.

In order to obtain a scanned image with high accuracy, the spot must be reduced. As the diameter of a spot becomes smaller, the focal depth (i.e., depth of field) becomes shallow. Therefore, in order to perform an image scan with high accuracy, the curvature of the field must be maintained as very small.

However, with the above-mentioned construction, the point of deflection on the polygon mirror, as shown in FIG. 21, is changed asymmetrically on both sides of the optical axis Ax2 of the fθ lens according to rotation of the polygon mirror. Therefore, there was a problem that the curvature of field becomes asymmetric on the surface to be scanned and correction can not be made when a lens symmetric with respect to the optical axis is used.

FIG. 22 shows a curvature of field for the construction of FIG. 20. The effective scanning field is 600 mm for an image height −300–+300 mm.

In order to reduce the curvature of field, it is effective to change the point of deflection symmetric with respect to the optical axis Ax2.

Therefore, as is shown in FIG. 23, it can be a construction with a laser beam that is incident to a polygon mirror along the optical axis Ax2 of the fθ lens can be considered. However, in order to employ such a construction, it is required that a static deflector, for separating a light beam directed to the polygon mirror from a light source, from a beam light incoming to an fθ lens, is disposed in the optical path.

When a laser beam is made incident onto the polygon mirror along the optical axis Ax2 of the fθ lens, the curvature of field becomes as shown in FIG. 24.

As the appearance of the curvature of the field becomes symmetric, correction can be made using a symmetric lens with respect to the optical axis and the value of the spot become very small.

Japanese Patent Early Laid-open Publication No. Sho 60-233616 dislcoses a construction in which a light beam from a light source is made incident to a polygon mirror along the optical axis of a scanning lens using a polarizing beam splitter and a ¼ wavelength plate.

However, according to the abovementioned Publication, the static deflector becomes complicated in structure and thus, the cost increases. Furthermore, because the angle of incidence of the light beam to a polarized beam splitter is changed in accordance with rotation of the polygon mirror, the transmittance of the polarized beam splitter is gradually changed as it goes toward the peripheral portion from the central portion and irregularity in the light quantity occurs on the surface to be scanned.

FIG. 25 shows one example of the change of transmittance of a polarized beam splitter caused by the change in the angle of incidence.

It is noted that in the Japanese Patent Early Laid-open Publication No. Sho 60-233616, a laser beam is temporarily imaged on a reflecting surface of a polygon mirror in an auxiliary scanning plane in order the correct adverse effect caused by inclination of the reflecting surface of the polygon mirror with respect to a rotational axis thereof.

Therefore, as the optical path in the auxiliary scanning plane becomes the same, both for the incident light beam to the polygon mirror, and the reflected light beam by the polygon mirror, the optical path can not be separated by a total reflection mirror, but a polarized beam splitter or a half mirror must be used.

SUMMARY OF THE INVENTION

The present invention has been designed in view of the above-mentioned problems. It is therefore an object of the invention to provide a scanning optical system which is comparatively simple in structure and yet capable of preventing deterioration of wave aberration on a scanning plane and drawing an image with high accuracy.

A scanning optical system according to the present invention images a light beam from a light source as a line spread function image in a principal scanning plane before the light beam is made incident to a scanning deflector. A static deflector is disposed in a line spread function image position in order to guide a light beam from a light source to a scanning deflector.

The static deflector has a slit mirror for reflecting a light beam from the light source or a mirror with a slit for permitting a light beam to be transmitted therethrough. The term "slit mirror" refers to an elongated mirror, while the term "mirror with a slit" refers to a mirror having an elongated slit (for permitting a light beam to be transmitted therethrough) formed in the center thereof. In the case the slit mirror is used, most of the light reflected by the scanning deflector passes by the slit mirror and forms a spot on the scanning surface through a scanning lens. In the case the mirror with a slit is used, most of the light reflected by the scanning deflector is reflected by mirror provided about the slit.

BRIEF DESCRIPTION OF THE DRAWINGS

FIG. 1 is a perspective view of a scanning optical system explaining a construction inclusive of first and second embodiments of the present invention.

FIG. 2 is a diagram showing the principal scanning plane according to a first embodiment.

FIG. 3 is a diagram showing the auxiliary scanning plane according to the first embodiment.

FIG. 6 is a diagram of the auxiliary scanning plane for explaining numeric values according to the first embodiment.

FIGS. 7A, 7B and 7C are aberration diagrams according to the construction of a numeric example 1 of the first embodiment.

FIGS. 8A, 8B and 8C are aberration diagrams according to the construction of a numeric example 2 of the first embodiment.

FIGS. 13A, 13B and 13C are aberration diagrams according to the construction of a numeric example 3 of the second embodiment.

FIG. 15 is a diagram showing a principal scanning plane of a scanning optical system according to a third embodiment of the present invention.

FIG. 16 is a diagram of a principal scanning plane of an optical system showing a modified embodiment of the apparatus of FIG. 15.

FIG. 17 is a diagram of a principal scanning plane of a scanning optical system according to a fourth embodiment of the present invention.

FIG. 18 is a diagram of an auxiliary scanning plane of the optical system shown in FIG. 17.

DETAILED DESCRIPTION OF THE EMBODIMENTS

Figure 4:
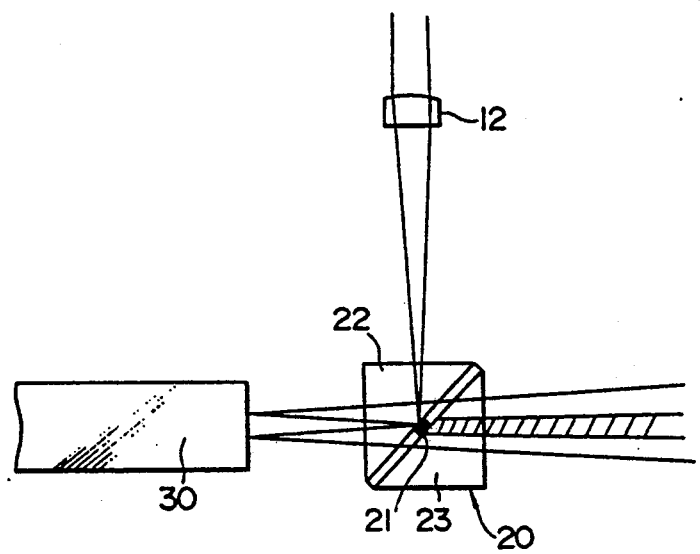
FIG. 4 is an enlarged view of the static deflector portion according to the first embodiment.

FIG. 1 shows an inclusive construction which covers the first and second embodiments of the invention.

The illustrated optical system includes a semiconductor laser 10 as a light source, a collimator lens 11 for collimating the divergent light which is emitted by the semiconductor laser 10, a cylindrical lens 12 acting as an imaging lens for imaging the collimated light beam as a line spread function image, a slit mirror 21 acting as a static deflector disposed in such a manner as to be coincident with the line spread function image, a polygon mirror 30 acting as a scanning deflector for reflecting and deflecting a light beam reflected by the slit mirror 21, and an anamorphic fθ lens 40 acting as a scanning lens for focusing a light beam reflected by the polygon mirror 30 on a scanning surface in order to form a spot thereon.

For ease in understanding, in the description to follow, a plane on which a light beam is scanned by the polygon mirror 30 is referred to as the "principal scanning plane", while a plane perpendicular to the principal scanning plane and including an optical axis of the scanning lens is referred to as "auxiliary scanning plane".

FIRST EMBODIMENT

FIGS. 2 through 8 show a first embodiment of a scanning optical system according to the present invention.

FIG. 2 is a diagram of the principal scanning plane of the optical scanning system of first embodiment and FIG. 3 is a diagram of the auxiliary scanning plane.

The apparatus is constructed such that the optical axis of a light beam made incident onto the slit mirror 21 from the semiconductor laser 10 is generally perpendicular to the principal scanning plane, and a light beam made incident to the polygon mirror 30 from the slit mirror 21 passes the optical axis Ax2 of the fθ lens 40.

Furthermore, a prism block 20 in which the slit mirror 21 is formed, as shown in FIG. 4, has a rectangular parallelepiped shape formed of two triangle bar prisms 22 and 23 cemented together at the slanted surfaces thereof and such cemented surfaces have a slit mirror 21 acting as a total reflection mirror vapor deposited thereon. The angle of the slit mirror 21 with respect to the principal scanning plane is approximately 45° and a crossing line formed when the slit mirror crosses the principal scanning plane is perpendicular to the auxiliary scanning plane. The slit mirror 21 as illustrated may be provided along the entire scanning width or it may be provided along a central portion to which the light beam from the semiconductor laser 10 is made incident.

The divergent light emitted from the semiconductor laser 10 is collimated and then imaged as a line spread function image perpendicular to the auxiliary scanning plane by the cylindrical lens 12. As the slit mirror 21 is disposed in such a manner as to be coincident with this line spread function image, the light beam from the light source is imaged on the slit mirror 21 and at the same time, the total quantity of the light is reflected by this reflecting surface and transmitted to the polygon mirror 30 along the optical axis Ax2 of the fθ lens 40.

The light beam reflected and deflected back by the polygon mirror 30 reaches the prism block 20 with a certain degree of spreading. Most of the light beam is made incident to the fθ lens 40 after passing through the prism block 20 of circumambient portion of the slit mirror 21 and form a spot on a scanning surface (not shown).

The prism block 20, which is different from a conventional beam splitter, has no change of transmittance caused by change in the angle of rotation of the polygon mirror 30 and has no change in spot intensity caused by the height of an image on the scanning surface.

The reason why the light beam from the light source can be reflected by the slit mirror 21 as described above is that the light beam is temporarily imaged as a line spread function image prior to impinging on a side of the polygon mirror 30. If optical system is designed such that the light beam from the light source is imaged on the reflecting surface of the polygon mirror as in the above-mentioned prior art, an optical path leading to the polygon mirror from the static deflector becomes the same as the optical path leading to the static deflector from the polygon mirror and the total reflection mirror can not be provided as in the present embodiment.

As the optical system of the present invention is set to have a large positive power in the auxiliary scanning direction in order to temporarily image the light beam on the slit mirror, the curvature of field tends to become low in the peripheral portion of the scanning surface. In order to correct the curvature of field, there can be considered that the cylinder surface or toric surface having a negative curvature in the auxiliary scanning plane is used for the other lenses.

However, if the negative power in the auxiliary scanning direction is made strong, it is possible to favorably correct the curvature of field but the wave aberration in the skew direction is deteriorated, thus resulting in a degraded spot shape.

A scanning optical system used in a laser printer, etc. has an F number of about 1:50–1:70 and a spot diameter of about 60–100 μm. Therefore, the degraded spot shape hardly adversely affects the quality of an image.

However, in such an apparatus as laser processing or the like which requires such high accuracy in dot density as 1000 dpi or more, a lens system having an F number of about 1:25–1:35 is required in order to reduce the spot diameter to about 30 μm and deterioration of the quality of an image caused by wave aberration in the skew direction becomes significant.

Particularly, in laser processing devices used for printing posters, etc., there are some which have a scanning extent of 600 mm or more. As the focal length of the lens system becomes long, it is very difficult to favorably correct the wave aberration which is expressed by wavelength unit and to correct for the curvature of the field.

In view of the above, in this embodiment, the prism block 20 is provided to act as a focusing point changing element. This element changes the focusing point in the auxiliary scanning surface plane so that the focusing point in a peripheral portion of the scanning is shifted for the beam traveling direction as compared with the focusing point in the central portion of the scanning surface. Thus, the curvature of field is corrected utilizing the change of the point of deflection of the polygon mirror 30 and the movement of the focusing point caused by the prism block.

Figure 10:
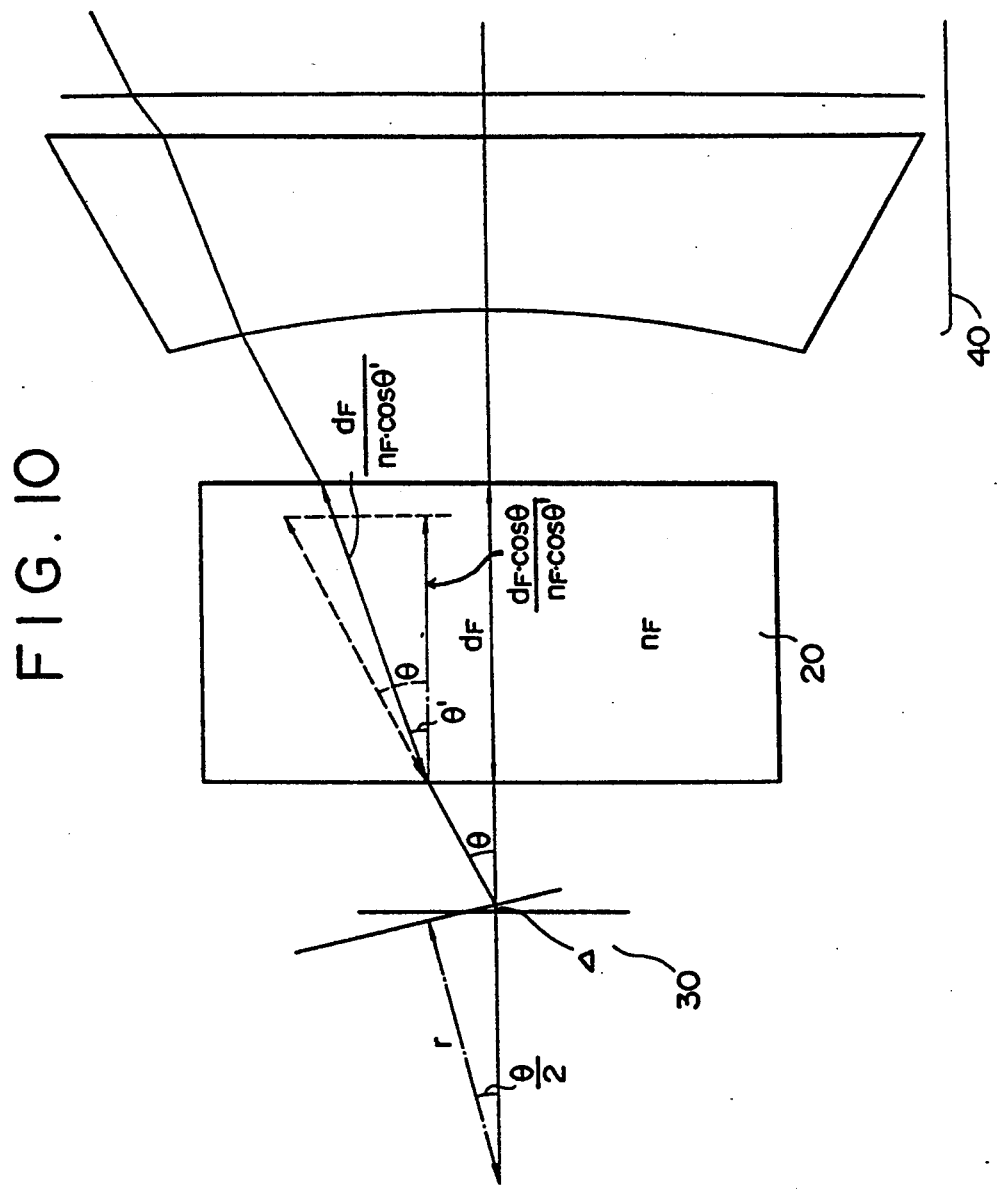
FIG. 10 is a diagram for explaining the change of the point of deflection and the function of a prism block.

Next, the principle concerning the change of the deflecting point of the polygon mirror 30 and the shift of the focusing point caused by the prism block 20 will be described with reference to FIG. 10.

When a reflected light beam from the polygon mirror 30 has a scanning angle $\theta$ with respect to the optical axis of the f$\theta$ lens, the polygon mirror 30 is rotated by $\theta/2$ with reference to a state where the reflecting surface of the polygon mirror is perpendicular to the optical axis.

At this time, the point of intersection between the reflecting surface and the incident beam is shifted from a reference deflection point in a state where the reflecting surface is perpendicular to the optical axis, by the following amount $\Delta$;

$$\Delta = r \cdot \left( \frac{1}{\cos(\theta/2)} - 1 \right)$$

wherein r is the inscribed circle radius. The object distance becomes short in the optical axis direction by the following amount $S_1$ compared with a case where the defection point is not changed;

$$S_1 = \Delta \cdot (1 + \cos \theta)$$

The light beam directed toward the f$\theta$ lens from the polygon mirror is a parallel light beam in the principal scanning plane but a divergent light beam in the auxiliary scanning plane. Because of the foregoing, the prism block 20 located in the optical path does not act on the light beam in the principal scanning plane and acts on the light beam in such a manner as to move the focal point depending on the angle of incidence in the auxiliary scanning plane.

An optical path length of a plane parallel plate having a refractive index n and a thickness d is able to convert a distance d/n in air to a distance d through the plate. Therefore, there occurs a movement of the focal point by $(d \cdot (n-1))/n$ between a case where the plane parallel plate is inserted in an optical path of a converging or divergent light and a case where the plane parallel plate is not inserted.

Similarly, when the prism block 20 acting as a plane parallel plate having a thickness $d_P$ in the optical axis direction is disposed between the polygon mirror and the f$\theta$ lens, an air converted distance of the travel of the beam passing through the prism block 20 is $d_P/n_P$ (wherein $n_P$ is the refractive index of the prism block) with reference to the light beam on the axis.

On the other hand, as the light beam outside the axis is a sagittal light beam, an air converted distance in the prism block is changed by an amount equal to the refractive index. The air converted distance of the refracted beam in the prism block becomes $$d_P/(n_P \cos \theta^-)$$

wherein the refractive angle is $\theta^-$.

$$n_P \sin \theta^- = \sin \theta$$

here.

The beam which is made incident to the prism block at an angle $\theta$ travels the same distance at an angle $\theta$ as shown by the broken line if the prism block is not positioned there. When the beam shown by the broken lines is projected to the optical axis, the length thereof becomes as follows;

$$(d_P \cos \theta)/(n_P \cos \theta^-)$$

Therefore, an optical axis difference $S_2$ with respect to the beam on the optical axis becomes as follows;

$$S_2 = (d_P/n_P)(1 - (\cos \theta / \cos \theta^-))$$

and the object distance of the peripheral portion is short by $S_2$.

That is, this indicates that the focusing point formed by the beam having the scanning angle $\theta$ is shifted by $S_1 + S_2$ for the beam traveling direction as compared with the focusing point formed by the beam on the optical axis Ax2.

Therefore, the peripheral curvature of field is improved by approximately;

$$mz^2(S_1+S_2)$$

wherein the power of the fθ lens system in the auxiliary scanning plane is mz.

In order to obtain the effect of correction of the curvature of field caused by the change of deflection point of the polygon mirror, it is desirable to satisfy the condition r>0.05 f, wherein r is the inscribed circle radius of the polygon mirror, and f is the focal length in the principal scanning direction of the fθ lens.

If r is smaller than 0.05 f, the effect due to the change of the deflection point is small. Thus, even if the focusing point changing element is inserted in the optical path, a sufficient correction of the curvature of field is unobtainable.

Also, in order to favorably correct the curvature of field, it is desirable to satisfy the following condition;

$$0.05f < mz^2(S_1+S_2) < 0.15f$$

wherein mz is a power of the fθ lens in the auxiliary scanning direction, $S_1$ is the change of the object distance in the auxiliary scanning direction caused by the polygon mirror, and $S_2$ is the change of the object distance in the auxiliary scanning direction caused by the focusing point changing element.

If it is lower than the lower limit, the change of the object distance caused by the polygon mirror and the focusing point changing element is small and a sufficient correcting effect on the curvature of field is unobtainable. If the shortage of correction is compensated for by increasing the negative power in the auxiliary scanning direction, the wave aberration is deteriorated.

On the contrary, if it exceeds the higher limit, the effect of the polygon mirror and the focusing point changing element becomes excessive and the polygon mirror and the focusing point changing element become impracticably large.

Figure 5:
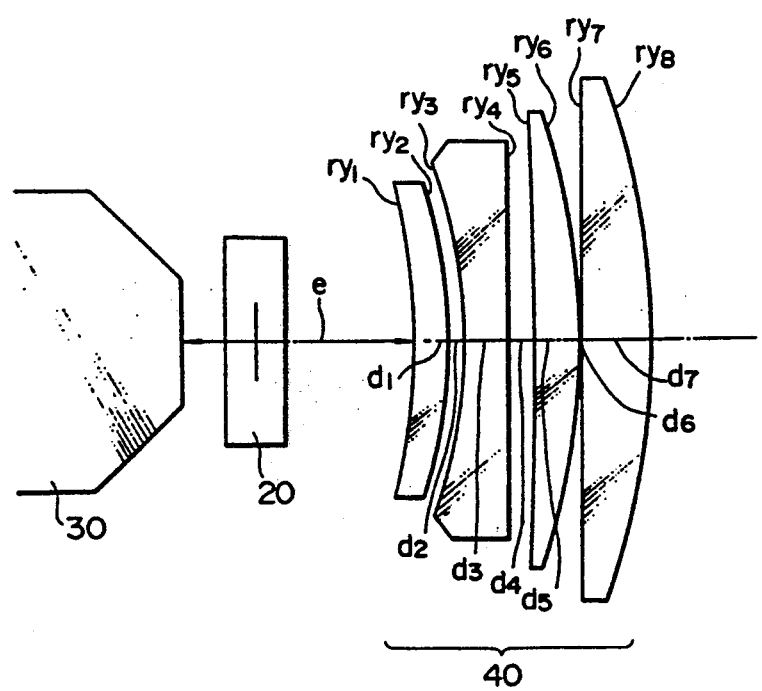
FIG. 5 is a diagram of the principal scanning plane for explaining numeric values of the apparatus according to the first embodiment.

Next, two numeric examples of the first embodiment will be described. FIGS. 5 and 6 show the principal and auxiliary scanning plane for explaining numeric values.

NUMERIC EXAMPLE 1

Table 1 and table 2 show the numeric example 1 of the first embodiment, table 1 shows the construction of the cylinder lens and table 2 shows the construction of the fθ lens. This example is suitable for a case where the semiconductor laser of a wavelength λ=780 nm is used. In FIG. 3, the cylindrical lens shown as a single lens for the convenience illustration, but actually the cylindrical lens is of a two piece construction consisting of a positive lens element and a negative lens element.

In the tables, the symbolic characters ry denote the radius of curvature in the principal scanning direction, rz the radius of curvature in the auxiliary scanning direction, fc the focal length in the auxiliary scanning direction of the cylinder lens, fy the focal length in the principal scanning direction of the fθ lens, and mz the lateral magnification in the auxiliary scanning direction of the fθ lens.

The aberration due to the construction of the numeric example 1 is as shown in FIGS. 7A, 7B and 7C. In this optical system, in order to balance the aberration, the actual image point is displaced from the paraxial image point in the principal and auxiliary scanning directions. And in the spherical aberration diagrams of FIGS. 7A, 7B and 7C, numeric values including such displacement of the image point are shown. This is likewise applicable to the following numeric examples.

TABLE 1

| surface No. | fc = 100.02 | | | |
|---|---|---|---|---|
| | ry | rz | d | n |
| 1 | ∞ | 20.8 | 8.00 | 1.51072 |
| 2 | ∞ | ∞ | 1.19 | |
| 3 | ∞ | −29.5 | 6.00 | 1.51072 |
| 4 | ∞ | ∞ | | |

Distance from the final surface to the line spread function image: L1=80.12 mm

Air converted distance from the line spread function image to the reference deflection point: L2=29.96

Inscribed radius of the polygon mirror: r=75

Focusing point movement caused by the polygon mirror: S1=4.26

Prism block

Thickness: dF=30.0 Refractive index: nF=1.76591

Focusing point movement caused by the prism: S2=1.41

Distance from the reference deflection point to the first surface of the fθ lens including the prism block: e=118.35

Distance from the final surface to the scanning surface fb=751.26

TABLE 2

| surface No. | fy = 659.33 mz = 2.84 mz² = (S1 + S2) = 0.069fy | | | |
|---|---|---|---|---|
| | ry | rz | d | n |
| 1 | −288.139 | −288.139 | 17.66 | 1.76591 |
| 2 | −234.0 | −234.0 | 8.38 | |
| 3 | −236.0 | −236.0 | 22.44 | 1.71230 |
| 4 | ∞ | 215.0 | 12.84 | |
| 5 | −3236.220 | −3236.220 | 23.66 | 1.51072 |
| 6 | −328.301 | −328.301 | 1.00 | |
| 7 | ∞ | ∞ | 36.10 | 1.71230 |
| 8 | −350.0 | −96.7 | | |

NUMERIC EXAMPLE 2

Table 3 and table 4 show the numeric example 2 of the first embodiment. Table 3 shows the construction of the cylinder lens and table 4 shows the construction of the fθ lens. This example is suitable for a case where a He-Ne laser of a wavelength λ=632.8 nm is used as a the light source instead of the semiconductor laser. The aberration caused by the construction of the numeric sample 2 is as shown in FIGS. 8A, 8B and 8C.

TABLE 3

| surface No. | fc = 99.11 | | | |
|---|---|---|---|---|
| | ry | rz | d | n |
| 1 | ∞ | 20.8 | 8.00 | 1.51462 |
| 2 | ∞ | ∞ | 1.19 | |
| 3 | ∞ | −29.5 | 6.00 | 1.51462 |
| 4 | ∞ | ∞ | | |

Distance from the final surface to the line spread function image: L1=79.28 mm

Air converted distance from the line spread function image to the reference deflection point: L2=29.96

Inscribed radius of the polygon mirror: r=75

Focusing point movement caused by the polygon mirror: S1=4.26
Prism block
Thickness: dF=30.0 Refractive index: nF=1.77861
Focusing point movement caused by the prism: S2=1.40
Distance from the reference deflection point to the first surface of the f$\theta$ lens including the prism block: e=116.43

TABLE 4 fy = 659.42 mz = 2.87 mz$^2$ = (S1 + S2) = 0.071fy

| surface No. | ry | rz | d | n |
|---|---|---|---|---|
| 1 | −282.196 | −282.196 | 18.89 | 1.77861 |
| 2 | −231.100 | −231.100 | 8.45 | |
| 3 | −238.573 | −238.573 | 22.56 | 1.72309 |
| 4 | ∞ | 215.0 | 12.62 | |
| 5 | −3146.0 | −3146.0 | 23.02 | 1.51462 |
| 6 | −334.8 | −334.8 | 0.97 | |
| 7 | ∞ | ∞ | 36.26 | 1.72309 |
| 8 | −350.16 | −97.0 | | |

Distance from the final surface to the scanning surface: fb=752.86

SECOND EMBODIMENT

Figure 9:
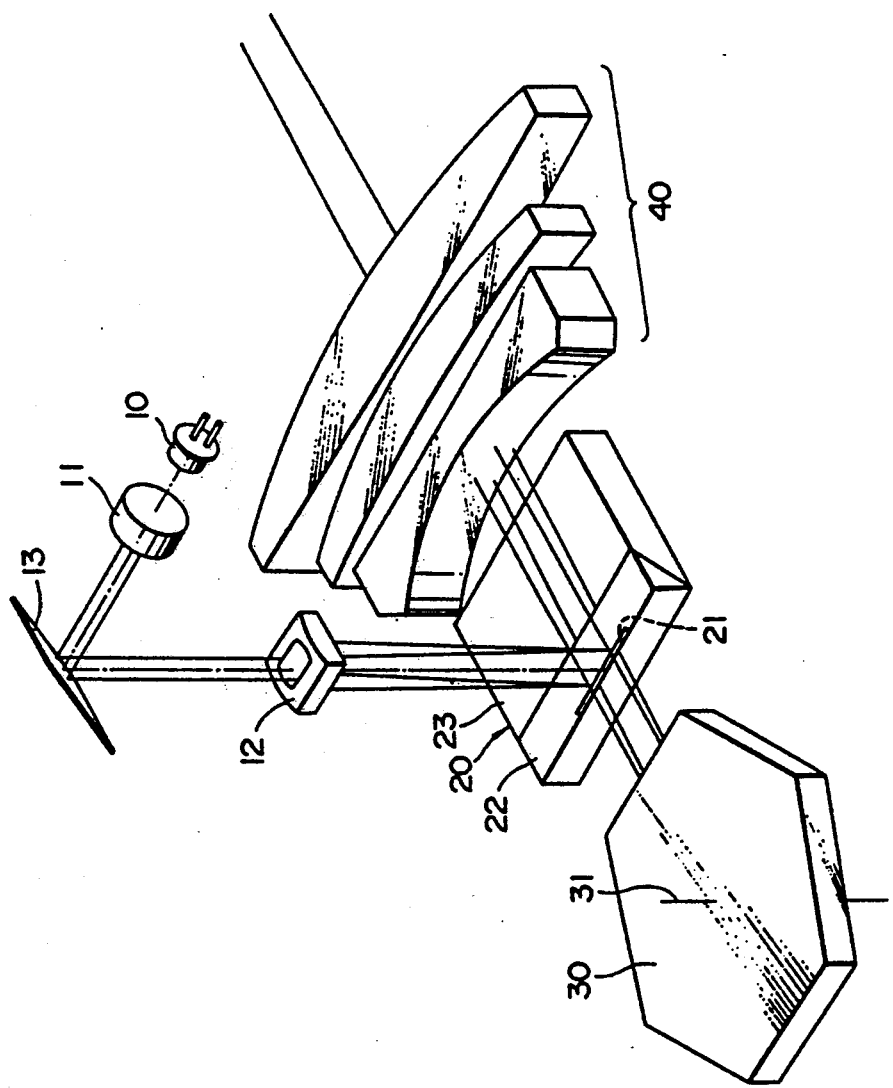
FIG. 9 is a perspective view of a scanning optical system according to a second embodiment of the present invention.

FIG. 9 shows the second embodiment of the present invention.

The illustrated optical system includes a semiconductor laser 10 as a light source, a collimate lens 11 for collimating a divergent light beam which is emitted by the semiconductor laser 10, a mirror 13 for reflecting the collimated light, a cylindrical lens 12 for imaging the collimated light beam as a line spread function image, a prism block 20 having a slit mirror 21 disposed in such a manner as to be coincident with the line spread function image of the light beam, a polygon mirror 30 reflecting and deflecting a light beam reflected by the slit mirror 21, and an f$\theta$ lens 40 for focusing a light beam reflected by the polygon mirror 30 on a scanning surface in order to form a spot thereon.

The prism block 20 has a rectangular parallelepiped shape formed of a triangular bar prism 22 and a trapezoidal prism 23 cemented together and such cemented surfaces have a slit mirror 21 vapor deposited thereon and acting as a total reflection mirror. The angle of the slit mirror 21 with respect to the principal scanning plane is approximately 45°.

In this embodiment, although a prism block is provided to act as a focusing point changing element having a plane perpendicular to the optical axis at both incident and outgoing sides thereof, it may be a lens, each surface of which is a curved surface so that a part of the power of the f$\theta$ lens can be born by it.

Next, two numeric examples will be described.

Figure 11:
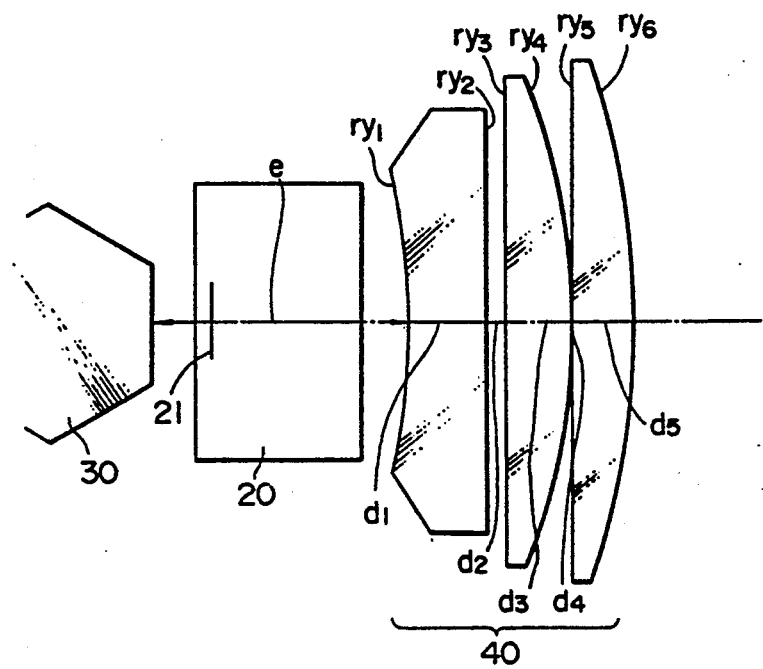
FIG. 11 is a diagram showing the principal scanning plane for explaining the numeric values of the apparatus of FIG. 9.
Figure 12:
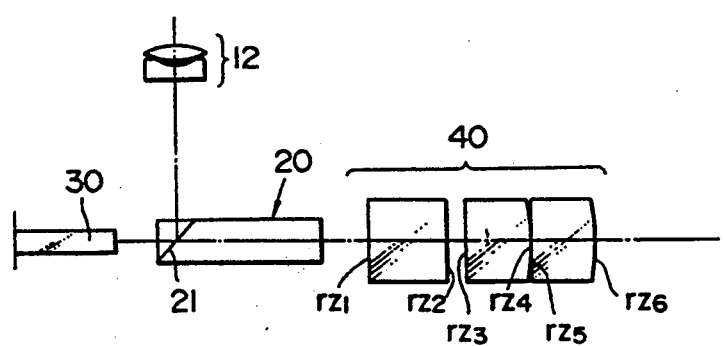
FIG. 12 is a diagram showing the auxiliary scanning plane for explaining the numeric values of the apparatus of FIG. 9.

FIG. 11 shows the principal scanning plane and FIG. 12 shows the auxiliary scanning plane.

NUMERIC EXAMPLE 3

Tables 5 and 6 shows the numeric example 3 of the second embodiment. Table 5 shows the construction of the cylinder lens and Table 6 shows the construction of the f$\theta$ lens. This example is suitable for a case where the semiconductor laser of a wavelength $\lambda$=780 nm is used. Aberration caused by the construction of the numeric example 3 is as shown in FIGS. 13A, 13B and 13C.

TABLE 5 fc = 100.61

| surface No. | ry | rz | d | n |
|---|---|---|---|---|
| 1 | ∞ | 21.0 | 10.00 | 1.51072 |
| 2 | ∞ | ∞ | 2.08 | |
| 3 | ∞ | −28.0 | 8.00 | 1.51072 |
| 4 | ∞ | ∞ | | |

Distance from the final surface to the line spread function image: L1=74.03 mm
Air converted distance from the line spread function image to the reference deflection point: L2=28.05
Inscribed radius of the polygon mirror: r=49
Focusing point movement caused by the polygon mirror: S1=2.78
Prism block
Thickness: dF=83.6 Refractive index: nF=1.51072
Focusing point movement caused by the prism: S2=3.87
Distance from the reference deflection point to the first surface of the f$\theta$ lens including the prism block: e=129.59

TABLE 6 fy = 659.63 mz = 3.02 mz$^2$ = (S1 + S2) = 0.092fy

| surface No. | ry | rz | d | n |
|---|---|---|---|---|
| 1 | −280.0 | −280.0 | 39.64 | 1.71230 |
| 2 | ∞ | 190.0 | 10.56 | |
| 3 | −3770.306 | −3770.306 | 31.21 | 1.51072 |
| 4 | −315.0 | −315.0 | 1.00 | |
| 5 | ∞ | ∞ | 32.00 | 1.71230 |
| 6 | −350.0 | −93.3 | | |

Distance from the final surface to the scanning surface: fb=763.23

NUMERIC EXAMPLE 4

Figures 14A, 14B, 14C:
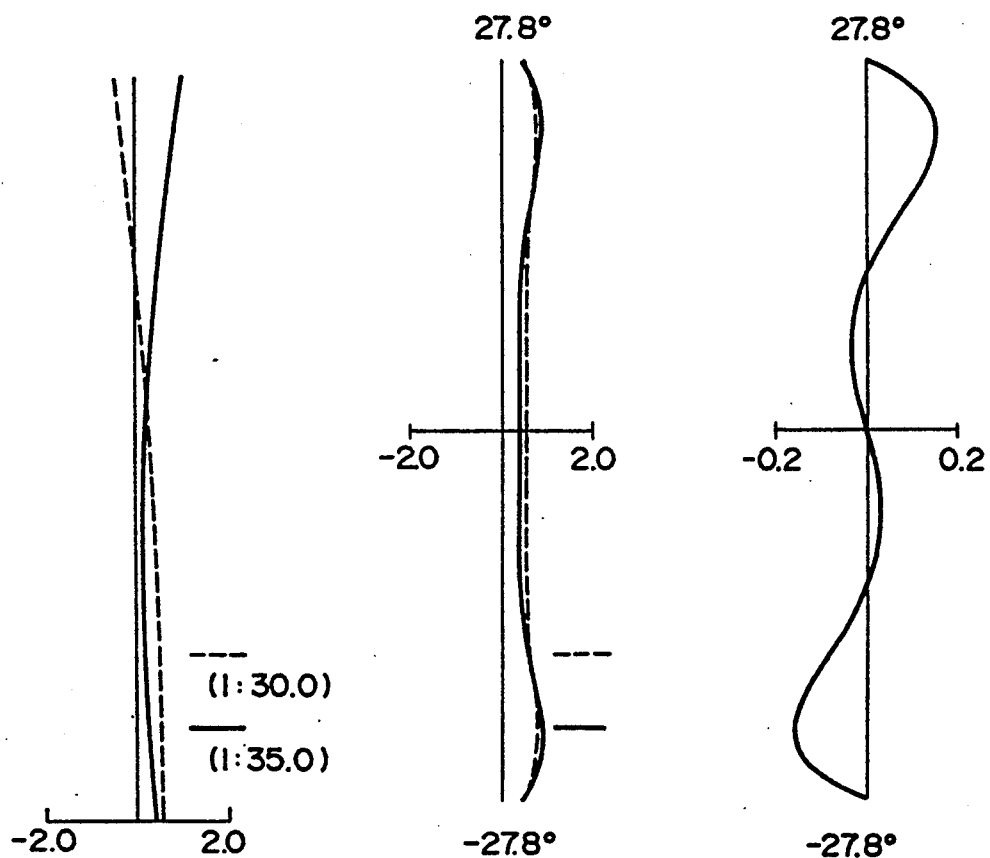
FIGS. 14A, 14B and 14C are aberration diagrams according to the construction of a numeric example 4 of the second embodiment.

Tables 7 and 8 show the numeric example 4 of the second embodiment. Table 7 shows the construction of the cylindrical lens and table 8 shows the construction of the f$\theta$ lens. This example is suitable for a case where an He-Ne laser of a wavelength $\lambda$=632.8 nm is used as a light source. Aberration caused by the construction of the numeric example 4 is as shown in FIGS. 14A, 14B and 14C.

TABLE 7 fc = 99.63

| surface No. | ry | rz | d | n |
|---|---|---|---|---|
| 1 | ∞ | 21.0 | 10.00 | 1.51462 |
| 2 | ∞ | ∞ | 2.08 | |
| 3 | ∞ | −28.0 | 8.00 | 1.51462 |
| 4 | ∞ | ∞ | | |

Distance from the final surface to the line spread function image: L1=73.15 mm
Air converted distance from the line spread function image to the reference deflection point: L2=27.42
Inscribed radius of the polygon mirror: r=49
Focusing point movement caused by the polygon mirror: S1=2.78
Prism block
Thickness: dF=83.6 Refractive index: nF=1.51462
Focusing point movement caused by the prism: S2=3.87

Distance from the reference deflection point to the first surface of the $f\theta$ lens including the prism block: $e = 130.72$

TABLE 8

$fy = 659.92$  $mz = 3.09$  $mz^2 = (S1 + S2) = 0.096fy$

| surface No. | ry | rz | d | n |
|---|---|---|---|---|
| 1 | −285.0 | −285.0 | 39.64 | 1.72309 |
| 2 | ∞ | 190.0 | 10.66 | |
| 3 | −3421.511 | −3421.511 | 31.77 | 1.51462 |
| 4 | −322.800 | −322.800 | 1.00 | |
| 5 | ∞ | ∞ | 32.00 | 1.72309 |
| 6 | −350.0 | −94.4 | | |

Distance from the final surface to the scanning surface: $fb = 764.47$

THIRD EMBODIMENT

FIG. 15 is a principal scanning plane diagram showing the third embodiment of the present invention.

In this example, the optical axis of the light beam made incident to a static deflector from the semiconductor laser 10 is generally included within the principal scanning plane. The static deflector is the slit mirror 21 having a longitudinal direction in the principal scanning plane. This slit mirror 21 is located in the imaging position of the light beam caused by the cylindrical lens 12. Also, the slit mirror 21 is disposed in such a manner as to be perpendicular to the principal scanning plane and inclined with respect to the optical axis of the $f\theta$ lens so that the light beam from the semiconductor laser 10 would be made incident to the polygon mirror 30 along the optical axis Ax2 of the $f\theta$ lens 40. Accordingly, the crossing line formed by crossing the slit mirror 21 with the auxiliary scanning plane is perpendicular to the principal scanning plane.

With the above-mentioned construction, the light beam from the semiconductor laser 10 is made incident to the slit mirror 21 at an angle in the principal scanning plane. Therefore, the peripheral portion of the light beam which is imaged on the slit mirror 21 is out of focus and the width in the auxiliary scanning direction of the slit mirror 21 can not be made too narrow. However, the entire path of the light beam can be set in the principal scanning plane, and the construction of the apparatus can be simplified.

Furthermore, the system can be designed such that a ghost light caused by reflection between the polygon mirror 30 and the slit mirror 21 is allowed to escape outside the area where the image is drawn.

FIG. 16 is a principal scanning plane diagram showing a modified embodiment of the third embodiment.

The construction of this embodiment is the same to that of FIG. 15 except that the set angle of the slit mirror 21 with respect to the optical axis Ax2 of the $f\theta$ lens 40 is different.

Figure 20:
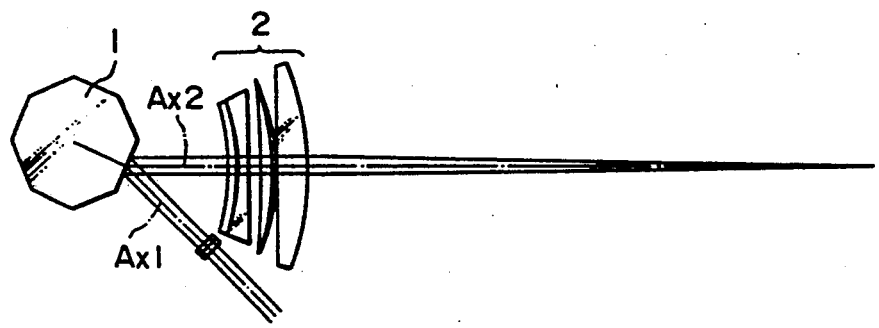
FIG. 20 is an diagram of a principal scanning plane showing an optical system of a scanning optical system for causing a light beam to be made incident to a polygon mirror from outside the scanning field.
Figure 21:
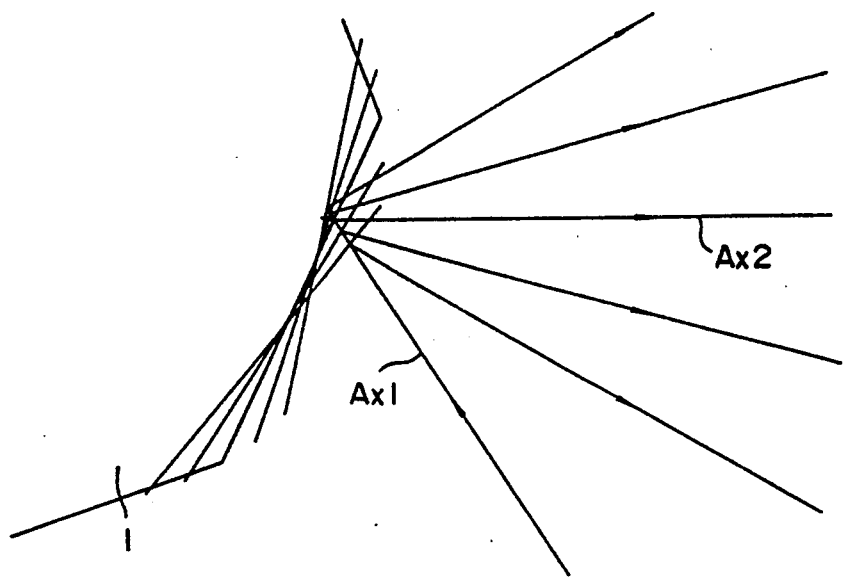
FIG. 21 is a diagram for explaining the change of the point of deflection caused by rotation of the polygon mirror of FIG. 20.
Figure 22:
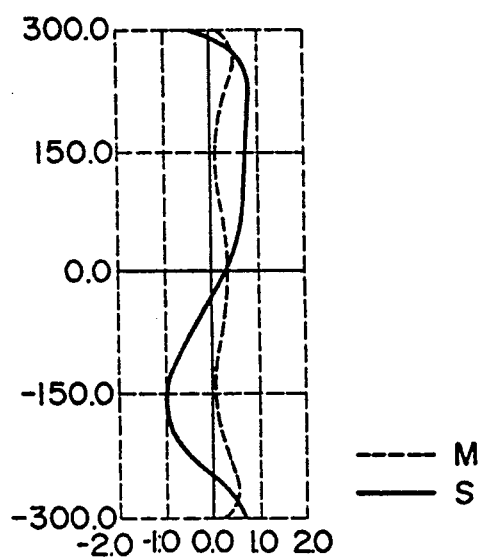
FIG. 22 is a diagram of the curvature of field caused by the apparatus of FIG. 20.
Figure 23:
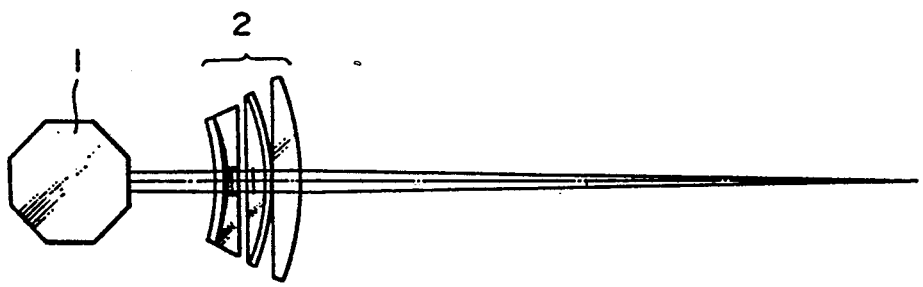
FIG. 23 is a diagram of a principal scanning plane showing an optical system of a scanning optical system for causing a light beam to be made incident to the polygon mirror along the optical axis of an fθ lens.
Figure 24:
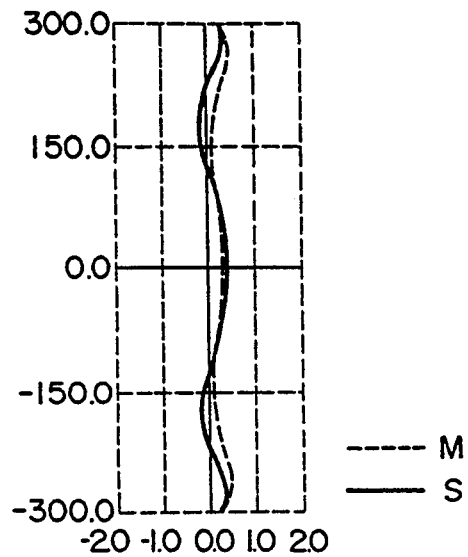
FIG. 24 is a diagram of the curvature of field caused by the apparatus of FIG. 23.
Figure 25:
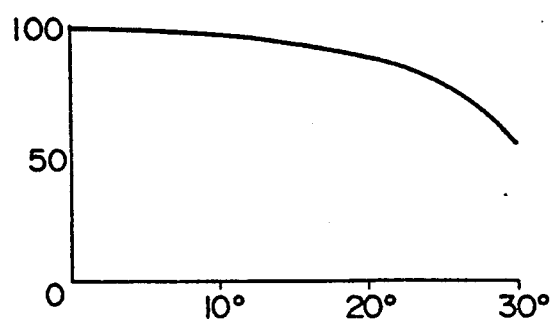
FIG. 25 is a graph showing the change of transmission of a polarized beam splitter caused by change in the angle of incidence.

With the above-mentioned construction, as the angle formed between the slit mirror 21 and the optical path of the light beam made incident from the light source becomes large, the length of the slit mirror 21 can be reduced as compared with the construction of FIG. 15. Although the light beam traveling toward the polygon mirror 30 from the slit mirror 21 is made incident from outside the optical axis of the $f\theta$ lens, deterioration of quality caused by this large angle is minor because the angle formed between the slit mirror 21 and the optical axis Ax2 is small when compared with the prior art as shown in FIG. 20.

4TH EMBODIMENT

Figure 19:
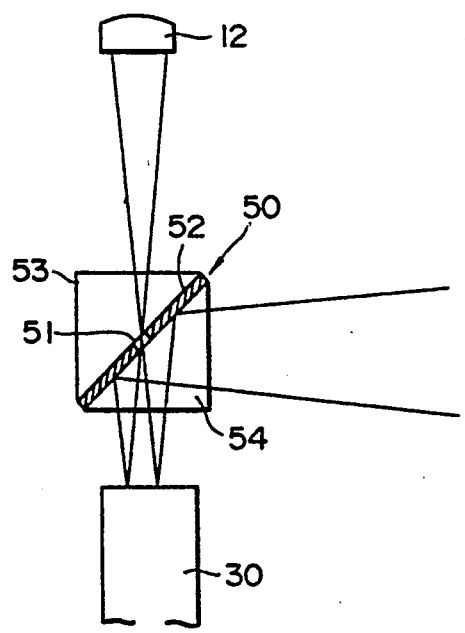
FIG. 19 is an enlarged view of a static deflector portion of the apparatus shown in FIG. 17.

FIGS. 17 through 19 show the fourth embodiment of the present invention.

In this embodiment, contrary to the first to the third embodiments, the light beam from the semiconductor laser 10 is transmitted by a prism block 50 toward the polygon mirror 30, and the light reflected by the polygon mirror 30 is deflected by a mirror 52 as the static deflector and made incident to the $f\theta$ lens 40. Furthermore, system is designed such that the optical axis of the light beam emitted from the semiconductor laser 10 is perpendicular to the optical axis Ax2 of the $f\theta$ lens 40.

The prism block 50, as shown in its enlarged scale in FIG. 19, includes a slit 51 which is located in the imaging position of the light beam caused by the cylindrical lens 12 and permits the light beam from the semiconductor laser 10 to be transmitted therethrough toward the polygon mirror 30 side, and a mirror 52 disposed about the periphery of the slit 51 and adapted to reflect the light reflected by the polygon mirror 30 toward the $f\theta$ lens 40 side. A mirror 52 is disposed on the cemented surface of the triangle bar prisms 53 and 54.

This prism block may be designed such that the slit 51 is arranged on the entire area of the scanning extent, or otherwise it may be arranged only at the central portion to which the light beam from the semiconductor laser 10 is made incident.

In the above embodiment, the polygon mirror was used as the scanning deflector. However, this is not material to the present invention and a galvano mirror may be employed as the scanning deflector.

Furthermore, by integrally assembling all of the component parts from the semiconductor laser 10 to the static deflector into one unit, assembling accuracy can be increased and displacement between the imaging position and the slit mirror 21 can be prevented.

What is claimed is:

1. A scanning optical system comprising:
a light source for emitting a light beam;
a scanning deflector for deflecting and scanning said light beam from said light source;
a scanning lens which focuses the deflected beam on a scanning surface to form a spot thereon;
a focusing point changing element disposed between said scanning deflector and said scanning lens and adapted to change a focusing point in an auxiliary scanning plane in a peripheral portion of said scanning surface so that said focusing point approaches said scanning lens from said focusing point in said auxiliary scanning plane in the central portion of said scanning surface.

2. The scanning optical system according to claim 1, wherein said focusing point changing element has an incident plane into which a light beam from said scanning deflector is made incident and an outgoing plane from which a light beam is emitted to said scanning lens.

3. The scanning optical system according to claim 1, further including a slit mirror for causing the light beam from said light source to be made incident to said scanning deflector along an optical axis of said scanning lens, said slit mirror being disposed between said scanning deflector and said scanning lens.

4. The scanning optical system according to claim 3, wherein said slit mirror is disposed within said focusing point changing element.

5. The scanning optical system according to claim 1, which satisfies the following relation:

$$r > 0.05f$$

wherein r is the radius of an inscribed circle of said scanning deflector and f is a focal length of said scanning lens in a principal scanning direction.

6. The scanning optical system according to claim 1, which satisfies the following relation:

$$0.05f < mz^2(S_1 + S_2) < 0.5f$$

wherein f is a focal length of said scanning lens in a principal scanning direction, mz is a power of said scanning lens in the auxiliary scanning direction, $S_1$ is the change of an object distance in the auxiliary scanning direction caused by change of a deflecting point of said scanning deflector and $S_2$ is the change of an object distance in the auxiliary scanning direction caused by said focusing point changing element.

7. A scanning optical system comprising:
a light source for emitting a light beam;
a polygon mirror for deflecting and scanning said light beam from said light source;
an fθ lens which focuses the deflected beam on a scanning surface to form a spot thereon; and
a focusing point changing element disposed between said polygon mirror and said fθ lens and adapted to change a focusing point in an auxiliary scanning direction within an auxiliary scanning plane in a peripheral portion of said scanning surface so that said focusing point approaches said fθ lens from said focusing point in said auxiliary scanning plane in the central portion of said scanning surface.

8. The scanning optical system according to claim 7, which satisfies the following relation:

$$r > 0.5f$$

wherein r is the radius of an inscribed circle of said polygon mirror, and f is a focal length of said fθ lens in a principal scanning direction.

9. The scanning optical system according to claim 7, which satisfies the following relation;

$$0.5f < mz^2(S_1 + S_2) < 0.15f$$

wherein f is a focal length of said fθ lens in a principal scanning direction, mz is a power of said fθ lens in the auxiliary scanning direction, $S_1$ is the change of an object distance in the auxiliary scanning direction caused by change of a deflecting point of said polygon mirror, and $S_2$ is the change of an object distance in the auxiliary scanning direction caused by said focusing point changing element.

10. The scanning optical according to claim 7, further including a slit mirror adapted to cause the light beam from said light source to be made incident to said polygon mirror along the optical axis of said fθ lens, said slit mirror being disposed between said polygen mirror and said fθ lens.

11. The scanning optical system according to claim 10, wherein said slit mirror is disposed within said focusing point changing elment.

12. A scanning optical system comprising:
a light source for emitting a light beam;
a scanning deflector for deflecting and scanning said light beam from said light source;
a scanning lens which focuses the deflected beam on a scanning surface to form a spot thereon; and
a focusing point changing element disposed between said scanning deflector and said scanning lens and comprising means for causing an optical path between said scanning deflector and said scanning surface to vary in accordance with an incident angle of the light beam incident to said focusing point changing element.

13. The scanning optical system according to claim 12, wherein said focusing point changing element has an incident plane onto which a light beam from said scanning deflector is made incident and an outgoing plane from which a light beam is emitted to said scanning lens.

14. The scanning optical system according to claim 12, further including a slit mirror for causing the light beam from said light source to be made incident to said scanning deflector along the optical axis of said scanning lens, said slit mirror being disposed between said scanning deflector and said scanning lens.

15. The scanning optical system according to claim 14, wherein said slit mirror is positioned within said focusing point changing element.

* * * * *

UNITED STATES PATENT AND TRADEMARK OFFICE
CERTIFICATE OF CORRECTION

PATENT NO. : 5,194,982
DATED : March 16, 1993
INVENTOR(S) : A. MORIMOTO

It is certified that error appears in the above-indentified patent and that said Letters Patent is hereby corrected as shown below:

At the Abstract, line 5, insert ---in order--- after "position".
At column 13, line 10 (claim 6, line 3), change "0.5" to ---0.15---.
At column 13, line 37 (claim 8, line 3), change "0.5" to ---0.05---.
At column 13, line 46 (claim 9, line 3), change "0.5" to ---0.05---.
At column 14, line 10 (claim 10, line 1), insert ---system--- after "optical".
At column 14, line 14 (claim 10, line 5), change "polyaen" to ---polygon---.

Signed and Sealed this

Twenty-sixth Day of July, 1994

Attest:

BRUCE LEHMAN

*Attesting Officer*      *Commissioner of Patents and Trademarks*